United States Patent [19]
Chang

[11] Patent Number: 5,908,130
[45] Date of Patent: Jun. 1, 1999

[54] OPENING AND CLOSING DEVICE OF A GASOLINE TANK CAP

[76] Inventor: Mong-Shiang Chang, No.2,Hsin-Hsing Rd., Wu-Jin Hsiang, Taichung Hsien, Taiwan

[21] Appl. No.: 08/909,633

[22] Filed: Aug. 12, 1997

[51] Int. Cl.$^6$ .................................................. B65D 49/00
[52] U.S. Cl. ........................ 220/254; 220/303; 220/820; 220/86.2
[58] Field of Search ...................... 220/562, 582, 220/303, 304, 254, 259, 203.05, 203.06, 203.07, 203.19, 203.21, 361, 363, DIG. 33, 86.1, 86.2, 811, 815, 816, 820

[56] References Cited

U.S. PATENT DOCUMENTS

| | | | |
|---|---|---|---|
| 5,435,358 | 7/1995 | Kempka et al. | 220/86.2 X |
| 5,544,780 | 8/1996 | Jye | 220/86.2 X |
| 5,547,099 | 8/1996 | Chang | 220/86.2 X |
| 5,615,793 | 4/1997 | Muller | 220/86.2 X |
| 5,732,842 | 3/1998 | Krause et al. | 220/86.2 X |

*Primary Examiner*—Stephen K. Cronin
*Assistant Examiner*—Nathan Newhouse
*Attorney, Agent, or Firm*—Bacon & Thomas

[57] ABSTRACT

An opening and closing device of a gasoline tank cap is disposed between an upper cap and a base of the tank cap, and includes a valve, a valve cap controlling the valve to rotate to let its valve hole communicate or not with an upper opening of the upper cap. Thus, the tank cap is not needed to be taken off completely for pouring gasoline in the tank. So filling gasoline in the tank is quite convenient, saving time, and preventing the tank cap from being lost by frequent removing for pouring gasoline in.

3 Claims, 4 Drawing Sheets

5,908,130

OPENING AND CLOSING DEVICE OF A GASOLINE TANK CAP

BACKGROUND OF THE INVENTION

This invention relates to an opening and closing device of a gasoline tank cap, particularly to one convenient to use, quick to handle and safe.

Vehicles are important for transportation, almost a pronoun of human feet, and their main fuel is gasoline stored in a tank, which is provided with a cap for taken off for filling gasoline therein and closed for keeping it from leaking out.

Conventional gasoline tank caps generally consist of an upper cap, a base and a locking ring. The base has threads around its annular surface to screw with a gas hole of the tank for opening and closing in pouring gasoline therein. However, the cap has to be taken off completely for filling gasoline, which is not convenient to use. Should the cap be left unclosed after filling, gasoline in the tank might leak out in running, causing horrible danger.

SUMMARY OF THE INVENTION

The purpose of the invention is to offer an opening and closing device of a gasoline tank cap, which includes a valve rotatable for a certain angle to control the gasoline tank in communicating or not with outside for opening or closing the tank cap, without necessity of completely taking off the cap.

The feature of the opening and closing device of a gasoline tank cap is a valve, an operating shaft, a valve cap, annular base and a gasket combined between an upper cap and a base of a gasoline tank cap.

The valve is located in a center hole of the upper cap, movable relative to the center hole to let a valve hole of the valve communicate with the center hole so that gasoline may flow down through the upper cap through the valve down into the interior of the tank.

The valve further has a pivotal shaft respectively standing upright on two opposite sides vertical to the center line of the valve hole, and one of the pivotal shaft provided with a second bevel gear facing a shaft hole of the upper cap. A swelled surface is provided around the other pivotal shaft, and two sides of the swelled surface are flat to be stopped by stop edges of the upper cap in due time.

The operating shaft fits in the shaft hole of the upper cap, having an upper portion protruding up through the upper cap for a certain length, and a lower portion provided with a first bevel gear engaging the second bevel gear. Thus, when the operating shaft is rotated by the valve cap manually swung, the valve is also rotated for a preset angle to permit the valve hole in a closed condition to the center hole of the upper cap move to an open condition to the center hole so that gasoline may flow down through the upper cap and the valve down into the interior of the tank.

The valve cap has a cap portion for closing the center hole of the upper cap, and a rod hole portion extending sidewise from the cap portion to combine firmly with the upper portion of the operative shaft.

The annular base is a ring with a center hole, fixed under a bottom of the upper surface of the upper cap and fitting around an intermediate portion of the valve, having two opposite shaft grooves for the two pivotal shafts of the valve to fit movably therein. The annular base further has a bearing hole under one of the shaft groove for a lower portion of the operating shaft to fit therein to stabilize the operating shaft.

The gasket is disposed between the surface of the valve and an inner surface of the base to keep those components with the upper cap combined with proper tightness, preventing gasoline in the tank from leaking out.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
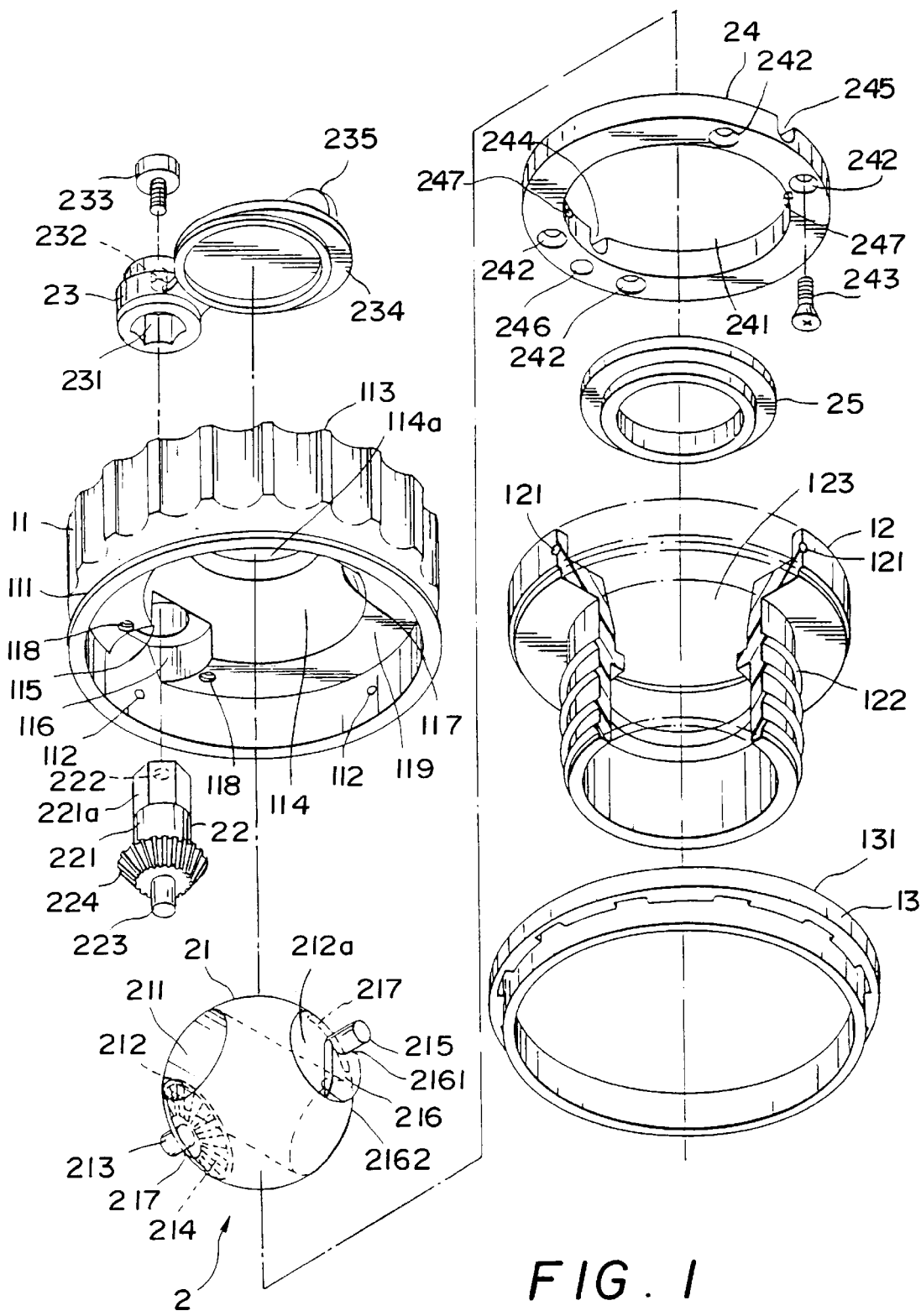
FIG. 1 is an exploded perspective view of a preferred embodiment of an opening and closing device of a gasoline tank cap in the present invention.
Figure 2:
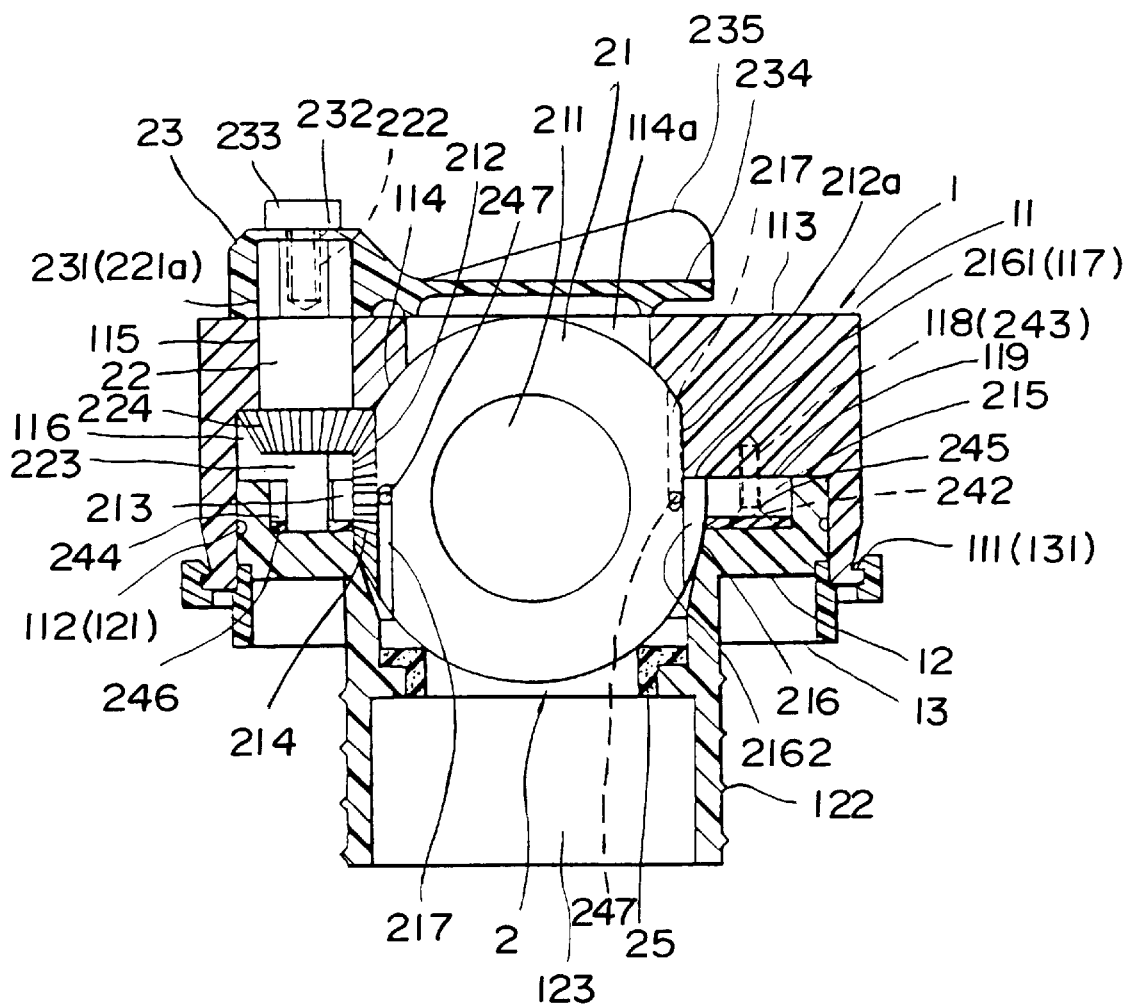
FIG. 2 is a cross-sectional view of the preferred embodiment of an opening and closing device in a closed condition in the present invention.

A preferred embodiment of an opening and closing device of a gasoline tank cap in the present invention, as shown in FIGS. 1 and 2, is disposed between an upper cap and a base of a gasoline tank cap, which includes the upper cap 11, the base 12 and a locking ring 13.

The upper cap 11 is formed integral with a plastic, having an outer annular surface formed with a plurality of continuous projections abutting with recesses for gripping by a hand, an engage annular edge 111 formed a little below the outer annular surface and its diameter is smaller than the outer annular surface, a projecting point 112 provided spaced apart quarterly on an inner annular surface.

The base 12 is T-shaped and hollow, having small grooves 121 spaced apart quarterly in an outer annular surface of an upper large-diameter portion to engage with the projecting point 112 of the upper cap 11 so as to combine the base 12 with the upper cap 11 firmly. Further, the base 12 has a longitudinal passageway 123 and a lower tubular portion with an outer surface having threads 122 to let the base 12 screw in a gas hole of a gasoline tank.

The locking ring 13 is made of a plastic, having an inner peripheral edge fitting around a lower annular edge of the upper large portion of said base 12, and an upper engage edge 131 engaging the engage edge 111 of the upper cap 11 so as to let the upper cap 11 and the base 12 combined securely.

What has just been described above are a conventional art, not what this application wants to claim, only to describe in relation to the upper cap 11 and the opening and closing device, the characteristics of which are to be described below.

The upper cap 11 further has a central hole 114 extending through down the upper surface 113 and having a hemispherical surface, an opening 114a formed in the upper surface 113, and a shaft hole 115 formed in the upper surface 113 beside the central hole 114, and a lower section of the shaft hole 115 communicating with a part of the central hole 114 to form a hollow 116 of a larger diameter than the shaft hole 115. The central hole 114 has a horizontal flat surface on an opposite side of the hollow 116 and a flat stop edge 117 formed in its bottom.

The opening and closing device 2 includes a valve 21, an operating shaft 22, a valve cap 23, an annular base 24, and a gasket 25.

The valve 21 is made integral of a plastic, shaped spherical, having its upper half contained in the center hole 114 of the upper cap 11, a valve hole 211 bored diametrically and having a diameter nearly the same as the diameter of the opening 114a in the upper surface 113, possible to move in a preset direction in the center hole 114 so that the valve hole 211 may communicate or not with the opening 114a. Further, the valve 21 is provided with a left and a right flat surface 212 and 212a vertical to the center line of the valve hole 211. The left flat surface 212 has a left pivotal shaft 213 upright on the center, and a second bevel gear 214 fitted firmly around the shaft 213. The right flat surface 212a also has a right pivotal shaft 215 upright on the center, a swelled surface 216 of a quarter circle defined by an upper straight position edge 2161 and a lower straight position edge 2162 to be stopped by the flat stop edge 117 of the center hole 114 in due time so as to limit the valve 21 in rotating and be positioned in in place. Further, the left and the right flat surface 212 and 212a respectively have a curved slide slot 217 a little longer than the swelled surface 216.

The operating shaft 22 has an intermediate rod portion 221 fitting in the shaft hole 115 of the upper cap 11, an upper hexagonal portion 221a on the intermediate portion 221 protruding up through the upper surface 113 of the upper cap 11, a threaded hole 222 in an upper side of the upper hexagonal portion 221a, a lower small-diameter portion 223, a first bevel gear 224 formed between the lower portion 223 and the intermediate portion 221 and located in the hollow 116 of the upper cap 11 to engage with the second bevel gear 214 of the valve 21.

The valve cap 23 has a round cap body 234 and a rod hole portion with a hexagonal rod hole 231 formed beside the body 234, a screw hole 232 formed between the rod hole 231 and top of the rod hole portion so as to combine the valve cap 23 with the upper hexagonal portion 221a of the operating shaft 22. A screw 233 screws with the screw hole 232 and the threaded hole 222 of the upper hexagonal portion 221a to combine the valve cap 23 with the operating shaft 22. The round cap body 234 closes on the opening 114a of the upper cap 11, having a projection 235 extending sidewise for pushing manually the valve cap 23 to swing for 90 degrees or so.

The annular base 24 is a ring, having a center hole 241, a plurality of screw holes 242 spaced around for screws 243 to fit through and in the threaded holes 118 of the upper cap 11 so as to fix the annular base 24 on a bottom surface 119 of the upper cap 11. The annular base 24 further has a left and a right pivotal groove 244 and 245 for the left and the right pivotal shaft 213 and 215 of the valve 21 to fit and rotate therein so that the valve 21 may rotate in a limited scope (angle) in the center hole 114 of the upper cap 11. Further, the annular base 24 has s bearing hole 246 under the pivotal groove 244 for the lower portion 223 of the operating shaft 22 to fit securely therein to let the operating shaft 22 rotate precisely. In addition, the annular base 24 has a semicircular projection 247 respectively on the opposite points of an inner surface near the left and the right pivotal groove 244 and 245 to fit and move in each of the two curved slide slots 217, 217 of the valve 21 after the annular base 24 is fixed on the upper cap 11 so that the valve 221 may rotate in a preset direction stably and smoothly.

The gasket 25 is made of PU, T-shaped and annular, having its bottom fitting in the center passageway 123 of the base 12 and its upper surface contacting with the spherical surface of the valve 212 to keep the upper cap 11, the base 12 and the valve 21 combined tightly for preventing gasoline from leaking out and dirt or tiny matters from entering the gasoline tank.

Next, combination and use of the invention is described as follows. Referring to FIG. 2, the valve cap 23 is normally closed on the opening 114a of the upper surface of the upper cap 11, with the valve hole 211 of the valve 21 not communicating with the opening 114a, which which means the gasoline tank cap in the closed condition.

Figure 3:
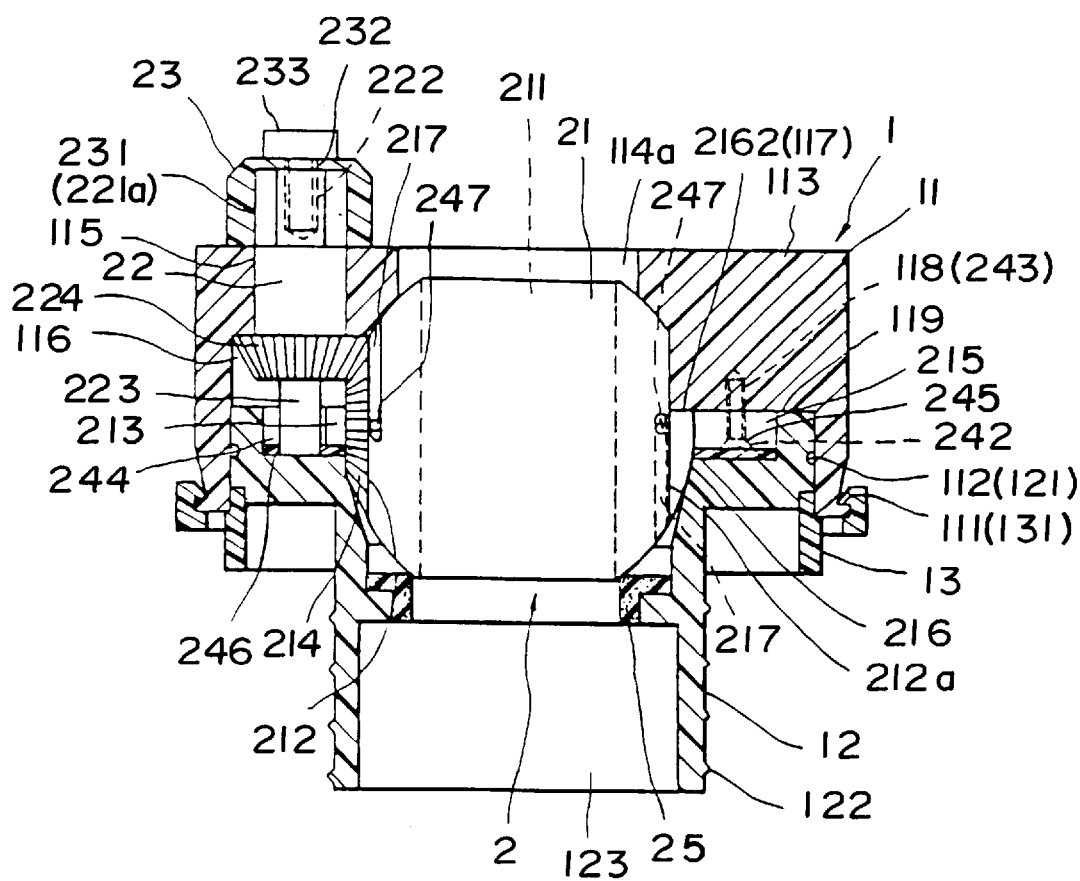
FIG. 3 is a cross-sectional view of a valve cap rotated to let a valve hole of a valve communicate with a center hole of an upper cap in the preferred embodiment of an opening and closing device in the present invention.
Figure 4:
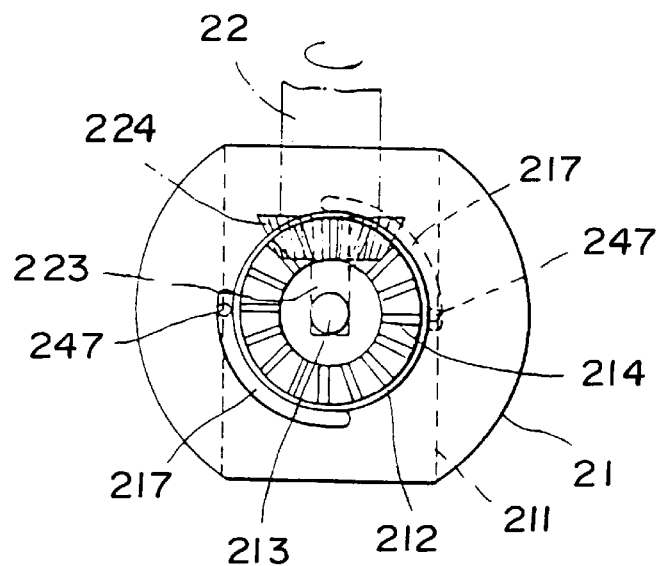
FIG. 4 is a cross-sectional view of the valve hole of the valve opened with projections of the base fitting in curved slide slots of the valve in the present invention; and, FIG. 5 is a cross-sectional view of the valve hole in the opened condition with the projections of the annular base fitting in the curved slide slots of the valve in the present invention.
Figure 5:
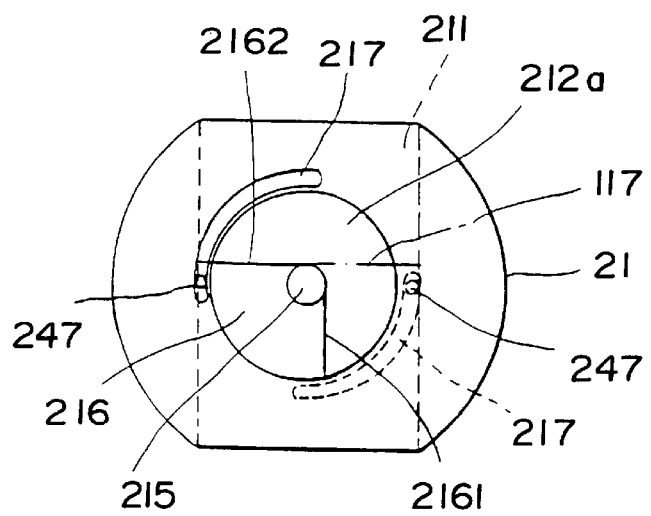

Now referring to FIG. 3, if gasoline in the tank is little to be supplied, the tank cap 1 is not needed to be taken off completely, but the valve cap 23 is rotated counterclockwise for 90 degrees with the operating shaft 22 functioning as a pivot, and the operating shaft 22 also is rotated by the rod hole portion of the valve cap 232 for the same angle, 90 degrees. Then the valve 21 is then rotated for 90 degrees with the pivotal shafts 213, 215 as a pivot, as shown in FIGS. 4 and 5, with engagement of the first bevel gear 224 and the second bevel gear 214 of the valve 21. Then the lower position edge 2162 of the swelled surface 216 of the valve 21 is also rotated to come to the stop edge 117 of the upper cap 11, moving the valve hole 211 of the valve 21 to communicate with both the opening 114a and the center passageway of the base 12, forming a passageway in the tank cap 1 from the opening 114a to the interior the tank for gasoline to flow down. When the tank is poured full with gasoline, only swinging of the valve cap 23 clock wise for 90 degrees can recover the closed condition of the valve 21 and the operating shaft 22 shown in FIG. 2.

Referring to FIGS. 4 and 5, when the valve 21 is rotated, the two curved slide slots 217 also move, fitting with the semicircular projections 247 of the annular base 24, enabling the valve 21 rotating very stably and smoothly during the movement and never biasing to other directions. At the same time, the surface of the semicircular projections 247 and the inner surface of the slots 217 are designed to contact properly so that the semicircular projections 247 can function to position the valve 21 securely in place, cooperated by the upper and the lower position edge 2161 and 2162 stopped by the stop edges 117. Thus the valve 21 is never changed in its position by an external vibration or a random force.

Finally, it should be noticed that the opening and closing structure of the present invention not only obtains common usage as a tank cap, but also facilitates a worker of a filling station to fill gasoline in a gasoline tank with convenience and speed as well without need of taking off the tank cap. Besides, the tank cap will never be lost. Further, a lock can be attached to the upper cap 11 to lock the valve 21, or an air leaking structure can be added to the valve 21 to cope with demands of various vehicles.

While the preferred embodiment of the invention has been described above, it will be recognized and understood that various modifications may be made therein and the appended claims are intended to cover all such modifications which may fall within the spirit and scope of the invention.

What is claimed is:

1. A opening and closing device of a gasoline tank cap consisting of an upper cap and a base, said opening and closing device located between said upper cap and said base for directly controlling to open and close said gasoline tank cap without taking off said tank cap;

said upper cap having a center hole extending from an upper surface to a bottom, said center hole shaped hemispheric and having an opening in the upper surface, a shaft hole formed beside said center hole, a larger diameter hollow than a diameter of said shaft hole formed under said shaft hole and communicating with said center hole, a vertical flat surface formed in said center hole in an opposite side from said larger diameter hollow and a stop edge formed at a bottom of said vertical flat surface;

said opening and closing device comprising a valve, an operating shaft, an annular base and a gasket;

said valve being spherical and rotatable for approximately 90 degrees in said center hole of said upper cap, having a valve hole able to communicate with said opening of said upper cap, a flat surface respectively provided on two opposite sides vertical to a center line of said valve hole, each said flat surface having a pivotal shaft extending outward on a center of said flat surface, one of said pivotal shafts having a second bevel gear fixed on an outer surface around said pivotal shaft and facing said larger diameter hollow of said upper cap, a swelled surface of a quarter circle formed on said other flat surface and defined by an upper position edge and a lower position edge to be stopped by said stop edge of said upper cap when said valve is rotated and thus limiting the value rotating angle;

said operating shaft fitting in said shaft hole of said upper cap, having an upper portion extending up through said upper surface of said upper cap, a lower rod portion having a first bevel gear extending in said larger diameter hollow of said upper cap and engaging said second bevel gear of said valve so as to rotate said valve by rotation of said operating shaft;

said valve cap having a cap portion to close said upper opening of said upper cap, and a rod hole portion extending laterally from said cap portion to fit with said upper portion of said operating shaft;

said annular base shaped as a ring with a center hole, fixed under the bottom of said upper cap and fitting around an intermediate portion of said valve, having a pivotal groove respectively in opposite sides to fit with each of said two pivotal shafts of said valve so as to permit said valve to rotate in said center hole of said upper cap for approximately 90 degrees, a bearing hole provided under one of said pivotal grooves for said lower portion of said operating shaft to fit therein to permit said operating shaft to rotate precisely and smoothly; and, said gasket located between said valve and said base for tightening said upper cap, said base and said valve properly to prevent gasoline stored in a gasoline tank from leaking out of the tank cap and dirt from entering the gasoline tank cap.

2. The opening and closing device of a gasoline tank cap in claim 1, wherein said valve further has a curved slide slot respectively in said two flat surfaces, and said annular base has a projection on opposite sides on an inner annular surface to engage in said two slide slots of said valve so that said valve may rotate stably and smoothly in a limited angle.

3. The opening and closing device of a gasoline tank cap in claim 1, wherein said upper portion of said operating shaft is hexagonally shaped and has a threaded hole in an upper surface, and said valve cap has a hexagonal hole in said rod hole portion for said hexagonal upper portion of said operation shaft to fit firmly therein and a vertical screw hole bored in an upper side for a screw to combine tightly said valve cap with said operating shaft, and said cap portion attached with a sidewise projection for manually pushing said valve cap to swing open or close said upper opening of said upper cap.

* * * * *